(12) United States Patent
Cichorek et al.

(10) Patent No.: US 9,194,521 B2
(45) Date of Patent: Nov. 24, 2015

(54) PLUG-IN CONNECTOR

(75) Inventors: Hermann Cichorek, Gieboldehausen (DE); Dirk Kramer, Noerten-Hardenberg (DE); Sevket Celovic, Wolfsburg (DE); Alfons Laumann, Gifhorn (DE)

(73) Assignees: VOLKSWAGEN AG, Wolfsburg (DE); AFT AUTOMOTIVE GMBH & CO. KG, Nordwalde (DE)

( * ) Notice: Subject to any disclaimer, the term of this patent is extended or adjusted under 35 U.S.C. 154(b) by 881 days.

(21) Appl. No.: 13/384,368

(22) PCT Filed: Jul. 3, 2010

(86) PCT No.: PCT/EP2010/004027
§ 371 (c)(1),
(2), (4) Date: Jan. 17, 2012

(87) PCT Pub. No.: WO2011/006591
PCT Pub. Date: Jan. 20, 2011

(65) Prior Publication Data
US 2012/0119485 A1  May 17, 2012

(30) Foreign Application Priority Data
Jul. 14, 2009 (DE) .......................... 10 2009 033 943

(51) Int. Cl.
*F16L 35/00*  (2006.01)
*F16L 37/098*  (2006.01)

(52) U.S. Cl.
CPC ......... *F16L 37/0985* (2013.01); *F16L 37/0982* (2013.01)

(58) Field of Classification Search
CPC .......................... F16L 37/0985; F16L 37/0982
USPC .............. 285/319, 322, 81, 84–88, 307, 308, 285/921, 310, 311, 314–317, 362, 243
See application file for complete search history.

(56) References Cited

U.S. PATENT DOCUMENTS 1,910,706 A * 5/1933 Malzard ........................ 285/314
5,112,086 A   5/1992 Gruber et al.
(Continued)

FOREIGN PATENT DOCUMENTS

DE  197 35 491 C1  7/1998
DE  198 31 897 A1  1/2000
(Continued)

*Primary Examiner* — Michael P Ferguson
*Assistant Examiner* — Jay R Ripley
(74) *Attorney, Agent, or Firm* — Laurence A. Greenberg; Werner H. Stemer; Ralph E. Locher (57) ABSTRACT

A plug-in connector for detachably connecting two lines has a first connector element, a second connector element, a carrier element to be fixed to the first connector element, and a latching element with at least one latching arm. The latching arm is disposed on the carrier element and when it is in a latching position, latches onto a matching latching element of the second connector element. The latching element is axially displaceable to assume a latching arm securing position and a latching arm release position relative to the carrier element. An operating element is provided on the carrier element for actuation in the latching arm release position to displace the latching arm into a separating position and which, when actuated in the latching arm securing position, retains the latching element in the latching arm securing position.

24 Claims, 8 Drawing Sheets (56) References Cited

U.S. PATENT DOCUMENTS

| | | | | |
|---|---|---|---|---|
| 5,226,680 | A | * | 7/1993 | Bahner et al. .................. 285/93 |
| 5,496,074 | A | | 3/1996 | Viratelle et al. |
| 5,992,895 | A | | 11/1999 | Steinkamp |
| 6,173,998 | B1 | | 1/2001 | Bock |
| 6,343,630 | B1 | * | 2/2002 | Dubinsky ...................... 141/385 |
| 2008/0238087 | A1 | * | 10/2008 | Wang et al. ..................... 285/39 |

FOREIGN PATENT DOCUMENTS

| | | |
|---|---|---|
| DE | 10 2004 053 541 A1 | 5/2006 |
| EP | 0 465 896 A1 | 1/1992 |
| EP | 0 280 180 A2 | 8/1998 |
| WO | 2006/048071 A1 | 5/2006 |

\* cited by examiner

PLUG-IN CONNECTOR

BACKGROUND OF THE INVENTION

Field of the Invention

The invention relates to a plug-in coupling for releasably connecting two lines, with a first coupling member, a second coupling member, a carrier element which can be fastened to the first coupling member, and a latching element, which has at least one latching arm and is arranged on the carrier element, wherein, in a latching position, the latching arm is designed for the latching holding of the second coupling member having a latching mating element, and the latching element is arranged displaceably in the axial direction so as to take up at least one latching arm securing position and one latching arm release position in relation to the carrier element.

Plug-in couplings of the type mentioned at the beginning are known from the prior art. For example, EP 0 465 906 B1 describes a connecting element for corrugated pipes and hoses having a hose wall corrugated in parallel, wherein the connecting element comprises an approximately cylindrical housing with a joining piece, a plurality of window-like openings in the housing wall, and a supporting ring which can be placed against the housing and has an annular surface on the end side and with limbs and locking parts at the free ends thereof. It is provided that the supporting ring in the form of a sliding sleeve consists of a stop ring, an inner ring arranged axially at a distance therefrom, webs connecting the stop ring and the inner ring, and limbs which extend from the inner ring toward the stop ring and have the locking claws at the free ends thereof. According to the exemplary embodiment, two opposite latching elements are provided here, the latching elements engaging around a latching mating element—a peripheral rib—of a connecting piece and holding the latter in a latching manner. The latching arms are provided on an annular latching element and are connected to one another via the latter. In order to release the connection, i.e. of the two coupling members from each other, the abovementioned sliding sleeve has to be shifted axially such that the latching element or the latching arms fastened thereto pass into a latching arm release position. As soon as the latching element is in the latching arm release position, the two coupling members can be separated from each other by vigorous pulling in the axial direction, the latching arms being pressed outward in the radial direction by said pulling such that they are in a separating position. Due to the construction, the latching arms can each enclose only a small angular range (in the circumferential direction) of the latching mating element. This reduces the reliability of the plug-in coupling especially upon application of a lateral load, as may occur, for example, in the event of an accident of a motor vehicle. Furthermore, due to the construction, the second coupling member, which is held by means of the latching arms, can also be released from the first coupling member under tensile loading (i.e. during operation) by axial shifting of the sliding sleeve. This constitutes a further source of danger during an accident since, under some circumstances, an unintentional release of the connection may occur.

DE 198 31 897 C2 shows a further similar plug-in coupling. A plug-in coupling for connecting two fluid lines is presented therein, the one fluid line having a holding rib. The plug-in coupling has a sleeve and a latching device which is guided in an axially displaceable manner in the sleeve and has, on a ring, holding arms which extend axially and are elastically flexible and have a hook, which is formed at the free end, for engaging behind the holding rib. Decoupling of the two fluid lines is provided by the holding arms being brought into an axially pulled-back unlocking position of the latching device, in which the hooks are not pressed by means of a radially outer oblique surface against a front edge of an aperture and can be expanded radially outward. The shifting of the holding arms into the unlocking position is brought about by radial compression of parts of the unlocking arms, wherein the latter slide over oblique surfaces. A plug-in coupling is therefore present, in which latching arms at least partially engage around a peripheral rib—the latching mating element—of the second coupling member.

In order to release the plug-in coupling, a force is applied inward in the radial direction to at least one of the latching arms, as a result of which the latching element is shifted rearward in the axial direction. The latching element is thereby shifted into the latching arm release position. The force can be applied, for example, by pressing by means of the thumb and index finger of one hand. In the latching arm release position, which is also referred to as the unlocking position, the latching arms can be expanded by axial pulling of the lines or of the coupling members apart in such a manner that then, by further axial pulling of the lines apart, the latter can be separated from one another. In order to shift the latching element into the latching arm release position, it suffices to actuate one of the latching arms.

Plug-in couplings of this type are generally fitted and released by hand, wherein certain installation and removal forces may not be exceeded. On the one hand, the latching arms have to hold the latching mating element as far as possible in such a manner that, upon axial shifting of the second coupling member relative to the first coupling member (away from the latter), said latching arms are moved into the latching position or forced therein. On the other hand, the plug-in coupling has to be able to be released easily in the event of removal. This necessitates compromises in the design of the latching arms. In particular, the prestressing forces of the latching arms may not be too high.

For this purpose, the latching lugs provided on the latching arms may not completely surround the latching mating element of the second coupling member. On the contrary, it has to be ensured, by means of rounded portions or oblique surfaces on an inside of the latching lugs or of the latching arms, that, when the plug-in coupling is opened by the coupling members or the lines being pulled apart axially, the latching arms can be shifted radially outward without great resistance. However, even small external influences, which may be caused, for example, by jamming or freezing up, are sufficient in order to keep the latching element in the latching arm release position thereof. This may result in an unintentional release of the plug-in coupling by pulling on one of the coupling members. In particular, also when heavy vibrations occur, or in the event of an accident, an unintentional shifting of the latching element may occur and therefore the connection may be released.

It is also not possible, because of the relatively narrow holding force required in order to hold the latching element in the latching arm release position, without a large structural outlay, to realize a plug-in coupling which can be opened only by actuation of at least two latching arms. Even if the plug-in couplings which are known from the prior art are provided with more than one, in particular two opposite latching arms or operating elements, the actuation of one latching arm or operating element customarily suffices in order to displace the latching element into the latching arm release position and therefore to permit release of the connection which is produced by means of the plug-in coupling. This can be considered critical, for example, in the event of an accident, since the plug-in coupling can be pressed in the process against an adjacent component, thus enabling actuation of the latching arm or of the operating element and therefore release of the connection.

In addition, the plug-in coupling described in DE 198 31 897 C2 has the disadvantage that one region of the axially displaceable latching element enters a housing of the plug-in coupling and serves to hold sealing elements. Since the latching element has to be movable axially, there is a clearance both in relation to the coupling member and in relation to the housing. This results in an asymmetrical loading on the sealing elements in the event of lateral loading of the plug-in coupling or of one of the coupling members, which may cause leakages of the connection.

BRIEF SUMMARY OF THE INVENTION

It is therefore the object of the invention to propose a plug-in coupling for releasably connecting two lines, which plug-in coupling does not have the disadvantages mentioned at the beginning but rather, in particular, permits release of the connection only when the latching element has been moved consciously beforehand into the latching arm release position.

This is achieved according to the invention by a plug-in coupling with the features mentioned in claim 1. In this case, it is provided that an operating element which can be actuated in the latching arm release position in order to shift the latching arm into a separating position is provided, in particular on the carrier element, said operating element, upon actuating in the latching arm securing position, holding the latching element in the latching arm securing position. Two lines can be connected releasably by means of the described plug-in coupling. For this purpose, the plug-in coupling has the first coupling member and the second coupling member—which are each designed, for example, in accordance with the SAE standard (SAE: Society of Automotive Engineers)—and which are each assigned to one of the two lines. The carrier element on which the latching element is arranged can be fastened to the first coupling member. The latching element has the at least one latching arm which interacts with a latching mating element (for example a holding rib) of the second coupling member in order to hold the latter in a latching manner when the latching arm is in the latching position. If the connection is intended to be released, the latching element should be shifted in the axial direction, in which case said latching element can take up the latching arm securing position and the latching arm release position. The shifting takes place relative to the carrier element.

The latching arms are secured in the latching arm securing position in such a manner that they cannot release the latching mating element of the second coupling member and the latter therefore cannot be separated from the first coupling member. By contrast, in the latching arm release position, the latching arms can be deflected elastically, in particular in the radial direction, by actuation of the operating element such that the second coupling member can be separated from the first coupling member by axial shifting. By actuation of the operating element, the latching arm is shifted into the separating position in which the second coupling member can be separated from the first coupling member. Therefore, the latching element first of all has to be displaced axially such that it enters the latching arm release position. The operating element subsequently has to be actuated in order to bring the latching arm into the separating position. Only when the latching element is in the latching arm release position can the latching arm, by actuation of the operating element, enter into the separating position which is necessary for release of the connection. Therefore, an unintentional release of the connection is not possible; rather, there always has to be an active intervention of the user who has to consciously carry out the two steps necessary for releasing the connection. During an actuation of the operating element in the latching arm securing position, the latching element remains in the latching arm securing position or is even held therein or forced into said position.

In addition, it is provided that, when the operating element is actuated, the latching element is held in the latching arm securing position or is forced into said position when the operating element is actuated while the latching element is in the latching arm securing position. Two steps are therefore always necessary in order to release the connection or the plug-in coupling. The latching element can be axially displaced, for example, in such a manner that the second coupling member interacts with the latching element in order to shift the latter in the direction of the latching arm release position upon axial shifting of the second coupling member in the direction of the first coupling member. Simple actuation of the operating element cannot bring the latching element into the latching arm release position and therefore cannot lead to a release of the connection.

A plug-in coupling is therefore realized, in which, by actuation of the at least one operating element, the latching arm can be brought into the separating position only in the latching arm release position of the latching element. The operating element may be, for example, assigned to the carrier element or fastened thereto. The operating element may also be brought into connection with the plug-in coupling only in order to release the connection. For this purpose, said operating element is introduced, for example, through a recess in the carrier element in order to shift the latching arm. With a plug-in coupling of this type, the connection of the two lines or the coupling members cannot be released by inadvertent actuation of the operating element, and therefore a very secure and reliable connection of the two lines is achieved. In this case, the connection of the two lines, which connection is produced by means of the plug-in coupling, is self-locking, i.e. a simple shifting of the coupling members in the axial direction with respect to each other—without the presence of the latching arm release position and actuation of the operating element—leads merely to the latching arm being forced in the direction of the latching mating element such that the connection is held all the more securely.

Further advantageous refinements emerge from the dependent claims.

It is provided, in a further development of the invention, that the latching arm release position is an engagement position in which the operating element interacts with the at least one latching arm, and the latching arm securing position is a non-engagement position. In this case, the operating element is assigned to the carrier element. The effect achieved by axially displacing the latching element with respect to the carrier element is that, in the latching arm securing position, the operating element can interact with the latching arm in order to shift the latter into the separating position. By contrast, this is simply not provided in the latching arm securing position. In this case, therefore, the non-engagement position is present, and therefore the operating element cannot interact with the latching arms. In the engagement position, for example, engagement elements of the operating element can interact with engagement mating elements of the latching arm.

In a development of the invention, the latching element has at least one stop element which interacts with the latching mating element in order to shift the latching element into the latching arm release position. It is therefore not only provided that the latching arm interacts with the latching mating element but also that the stop element is additionally present. The stop element can act here, for example, on the latching mating element, or the side thereof facing away from the latching arm. The effect which can be achieved by means of the stop element is that, when the second coupling member is shifted in the direction of the first coupling member, the latching element the latching element is moved in the direction of the latching arm release position or is actually shifted into said position. Release of the connection of the two lines is therefore easily possible by the two coupling members being shifted toward each other in the axial direction and the operating element being actuated when the latching element reaches the latching arm release position. The coupling members can subsequently be pulled apart in the axial direction, and therefore the connection is released.

In a development of the invention, the stop element is provided on a supporting arm and/or the supporting arm. In this case, the supporting arm is assigned to the latching element or is fastened thereto. The latching element therefore has the latching arm and the supporting arm. If a plurality of latching arms and supporting arms are provided, the latching arms and supporting arms may be provided in an alternating manner. In each case two latching arms and two supporting arms are preferably each provided diametrically with respect to one another. The stop element can be arranged both on the supporting arm and on the latching arm or in each case on both thereof.

In a development of the invention, the supporting arm has latching means in order, at least in the latching arm securing position, to interact with the latching mating element in order to hold the second coupling member by engaging therebehind. In addition to the stop element, the latching means is therefore provided on the supporting arm. However, in contrast to the latching arm, the latching means is provided merely in order to engage behind the latching mating element in order thereby to hold the second coupling member while the latching element is in the latching arm securing position. If, by contrast, the latching element is in the latching arm release position, it can be provided that the holding by means of engagement behind (or likewise by latching) can be released by axial shifting of the coupling members in relation to each other. For this purpose, the latching means can be configured in such a manner that, upon the axial shifting in the radial direction, said latching means are deflected resiliently outward such that the latching mating element can be shifted away below said latching means. If, by contrast, the latching element is in the latching arm securing position, the supporting arms having latching means, like the latching arms, are provided to ensure reliable holding of the second coupling member or of the latching mating element. In this case, the supporting arm, like the latching arm, upon axial shifting of the coupling members apart from one another when the latching element is in the latching arm securing position and not in the latching arm release position, is forced in the direction of the latching mating element in such a manner that the connection of the lines or of the coupling members is ensured. For this purpose, the latching means can be provided, for example, with a sliding surface which ensures the radial shifting of the supporting arm. The sliding surface may be an oblique surface and/or may have a curved profile. By the simultaneous provision of a latching arm and supporting arm, the supporting of the second coupling member with respect to the first coupling member can be significantly improved. In particular, a multi-point support during tensile loading of the connection in the axial direction is thereby achieved. Two latching arms and two supporting arms are advantageously arranged on the latching element, thus resulting in a four-point support.

In a development of the invention, the carrier element has at least one holding means in order to hold the latching arm and/or the latching means of the supporting arm in the latching position when the latching element is in the latching arm securing position. The holding means serves in particular, upon axial shifting of the coupling members apart while the latching element is in the latching arm securing position, to hold the latching arm and/or the supporting arm or the latching means thereof, the latching arm or the supporting arm in the latching position or to force the latching arm or the supporting arm into said position and therefore to ensure the latching holding or the latching interaction with the latching mating element. For example, there is an engaging-behind connection—i.e. a form-fitting connection—between the latching arm and/or the latching means and the latching mating element in the latching position. The holding means prevent the latching arm or latching means from being able to pass out of said latching position into the separating position. The releasable connection is therefore a self-locking connection which is preferably configured in such a manner that, upon axial shifting of the coupling members away from each other—without previous shifting of the latching element into the latching arm release position and actuation of the operating element—the latching arm and/or the latching means of the supporting arm are/is forced into the latching position.

In a development of the invention, a plurality of latching arms are provided, each latching arm is assigned an operating element and the latching elements can be brought into the separating position only when at least two of the operating elements are actuated. In this case, the latching arms are preferably distributed over a circumference of the latching element. The operating elements provided, for example, on the carrier element are assigned to the latching arms in such a manner that each operating element can act exclusively on a latching arm, in particular if the latching element is in the latching arm release position. In this case, the operating elements are assigned only to the latching arms, but not to the supporting arms. In order to release the connection of the two lines or coupling members, it is now provided for at least two of the operating elements, preferably all of the operating elements, to have to be actuated in order to bring the latching arms into the separating position. Release of the connection is therefore possible only when both the latching element has been shifted into the latching arm release position and also at least two operating elements are actuated. A very reliable system which is protected against mis-operations or unintentional release is therefore created.

In a development of the invention, the latching arms are arranged lying diametrically opposite one another. An arrangement of this type is advantageous in particular if an operating element is assigned to each latching arm, since, in this case, the operating elements which are then likewise arranged opposite one another can be actuated, for example, by the thumb and index finger, with an opposed application of force in each case. At the same time, the diametric arrangement of the latching arms results in the uniform introduction of the holding force of the latching arms and/or supporting arms on the latching mating element of the second coupling member.

In a development of the invention, the latching element is in the form of a bushing, and/or the at least one latching arm and the at least one supporting arm are distributed over the circumference of the latching element. In the form of a bushing here means that the second coupling member and/or a region of the carrier element are/is received in the latching element, and in particular the latching element is coordinated in a precisely fitting manner with said coupling member or region of the carrier element. The latching element can therefore essentially have a circular cross section and also—together with the carrier element—can serve as a guide element for the second coupling member and/or the carrier element. As already explained above, in a preferred embodiment, the latching arm and the supporting arm are provided on the latching element, with said latching arm and supporting arm being distributed over the circumference of the latching element. For example, a uniform distribution can be provided, and latching arm and supporting arm can each be arranged in an alternating manner.

In a development of the invention, the operating element is a flexible tongue. The flexible tongue is fastened to the carrier element, which is likewise in the form of a bushing, or is formed together with said carrier element. By means of such a design, the operating element does not have to have an additional joint since it inherently has sufficient flexibility in order to be actuated to release the connection and, for this purpose, to interact with the latching arm. The flexible tongue is in the form of a rocker, i.e. preferably has a free end.

In a development of the invention, the latching arm and the latching mating element have interacting stop surfaces which are substantially perpendicular to a longitudinal axis of the first and/or the second coupling member. In order to prevent the latching arm from being pushed out or pressed out of the form-fitting connection with the latching mating element, the stop surfaces are provided. The latching arm and latching mating element enter mutually into contact with said stop surfaces in order to prevent release of the first coupling member from the second coupling member when the latching arms are not in the separating position. The perpendicular arrangement with respect to the longitudinal axis of the coupling members prevents the stop surfaces from sliding along each other when an axial force acts on the coupling members in order to drive the latter apart. At the same time, however, the perpendicularly arranged stop surface permits easy release of the connection, should this be intended. However, an active release of the plug-in coupling has to take place, i.e. by means of the influence of the user. As an alternative, however, there is also clamping behind, i.e. the stop surfaces are inclined in such a manner that the latching arm is forced onto the latching mating element when there is an axial force for separating the coupling members.

In a development of the invention, the carrier element has a guide surface for the latching element, at least regions of which guide surface lie between the second coupling member and the latching element. The guide surface may be part of the sleeve-shaped carrier element or a sleeve-shaped region of the carrier element, which region both guides the latching element and supports the second coupling member. The latching element rests on the guide surface of the carrier element, where the contact between latching element and guide surface is designed in such a manner that tilting the latching element with regard to the carrier element is very substantially prevented. The latching element therefore rests with a certain axial extent on the guide surface. The guide surface is provided between the second coupling member and the latching element. This means that a side of the carrier element which faces away from the guide surface comes into contact with the second coupling member and likewise guides or supports said coupling member, i.e. stabilizes the latter in the radial direction.

In a development of the invention, a bearing point of the latching element is present on the carrier element, in particular on the guide surface thereof. The bearing point is, for example, a pivot point, i.e. a supporting point about which a rotational movement can take place. The latching element rests, by way of the bearing point, on the carrier element or the guide surface in such a manner that the rotational movement of the latching element—at least of regions, in particular of the latching arm and/or of the supporting arm—is permitted. The intention is therefore in particular to permit a rotational movement of the latching arm and/or of the supporting arm. The rotational movement is described by the latching arm and/or supporting arm during shifting into the separating position, i.e. whenever the operating element is actuated. In this case, the latching element is supported on the bearing point in such a manner that the forces, which are caused by the shifting, in the radial direction are absorbed by the carrier element. This means that they are not impressed onto the second coupling member, which would make it more difficult for the coupling members to move apart during release of the connection. The release of the connection is therefore assisted by the carrier element by radial forces acting on the latching element or regions thereof being absorbed by the carrier element and not being transmitted to one of the coupling members.

In a development of the invention, the carrier element has an engagement element which is arranged radially between the first coupling member and the second coupling member. In this case, the engagement element bears at least in regions over the circumference of the carrier element against the first and/or second coupling member. Support for one coupling member or both coupling members can thus be obtained such that said coupling members are advantageously secured against tilting in relation to each other. With the aid of the engagement element, guidance of the coupling members can be obtained, said guidance in particular simplifying displacement of the coupling members in relation to one another in the axial direction.

In a development of the invention, the engagement element is designed for the axial holding of at least one seal. The engagement element engages in an intermediate space which is present in the radial direction between the coupling members. A seal is also arranged at this point, in order to be able to produce a tight connection by means of the plug-in coupling. The engagement element is arranged in a suitable manner in order to prevent the seal from moving out of said intermediate space. The seal is advantageously fixed in the axial direction by means of the engagement element.

A development of the invention provides a deformable base element of the latching element for the substantially independent axial shifting of a plurality of latching arms. Normally, the latching element is shifted axially as a unit in order to bring it into the latching arm securing position or latching arm release position. However, if the plug-in coupling is designed in such a manner that only actuation of a plurality of operating elements, which are each assigned to a latching arm, leads to the shifting of the latching arms into the separating position, the latching arms are intended to be able to be shifted substantially independently of one another. The effect thereby achieved is that one region of the latching element can be in the latching arm release position while the other region is in the latching arm securing position. This is achieved by the elastic deformation of the base element. If only one of the operating elements is then actuated, when the (entire) latching element is in the latching arm release position and attempts to separate the coupling members from each other, then the latching arm, the operating element of which has not been actuated, is "carried along" in the axial direction by the latching mating element of the second coupling member, in particular caused by the form-fitting connection between the latching arm and the latching mating element, and is brought into a position which said latching arm would take up in the latching arm securing position of the latching element. Therefore, the latching arm can no longer pass into the separating position thereof, even if the associated operating element were subsequently also actuated. All of the operating elements therefore always have to be actuated, when the latching element is in the latching arm release position, in order to release the connection.

In a development of the invention, the operating element is formed integrally with the carrier element and/or the latching arm is formed integrally with the latching element. There is therefore no multi-part design and, in particular, the operating element or latching arm is not attached subsequently to the carrier element or the latching element. The operating element can advantageously be formed from the same material as the carrier element, or as the latching arm with the latching element, but a multi-component design may also be advantageous. It is therefore possible, for example, for the carrier element itself to be manufactured from a comparatively rigid material, whereas the operating element is flexible or elastic.

In a development of the invention, the latching element and/or the carrier element are/is composed of a plastic. Manufacturing from plastic is possible simply, rapidly and cost-effectively. At the same time, a plastic can be selected which meets the strength requirements of the plug-in coupling.

In a development of the invention, the latching element and/or the carrier element are/is an injection molded part. For example, the elements can be manufactured with the aid of an injection molding process. This also makes it possible to undertake simple, rapid and cost-effective manufacturing.

In a development of the invention, the carrier element and/or latching element are/is arranged at least in regions in a housing, in particular of plastic or metal. The above-described plug-in coupling permits a universal fitting of the carrier element and latching element into the housing. The housing may be composed, for example, of plastic or else manufactured from metal. Fastening of the carrier element and latching element to the housing can be provided, for example, by means of latching or another suitable connecting technique.

In a development of the invention, the carrier element and/or the housing have/has a recess for the operating element. The operating element can be arranged by means of or in the recess in such a manner that, in the engagement position, said operating element can interact with the latching arm in order to bring the latter into the separating position. Accordingly, the operating element does not have to be fastened fixedly to the carrier element or the housing (which may be the case) but rather, on the contrary, is only supplied by means of the recess if the latching arm is intended to be shifted into the separating position—after the latching element has been shifted into the latching arm release position.

BRIEF DESCRIPTION OF THE SEVERAL VIEWS OF THE DRAWING

The invention is explained in more detail below with reference to the exemplary embodiments illustrated in the drawing, without the invention being restricted. In the drawing.

DESCRIPTION OF THE INVENTION

Figure 1:
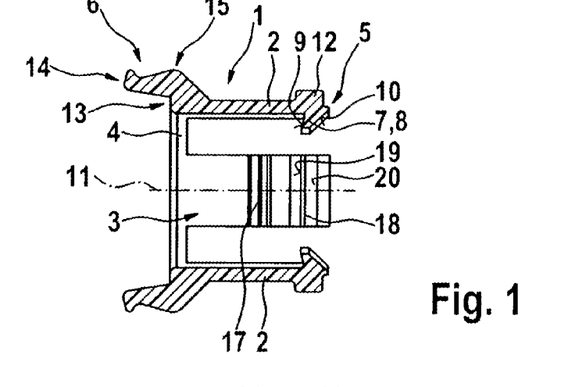
FIG. 1 shows a sectional view of a latching element with latching arms and supporting arms which each have a stop element and a latching means.

FIG. 1 shows a latching element 1 in a sectional illustration, the latching element, in the example depicted, having two latching arms 2 arranged diametrically with respect to each other and two supporting arms 3 likewise arranged diametrically with respect to each other. The latching arms 2 and the supporting arms 3 are arranged on an annular base element 4. In this case, it is provided that the latching arms 2 and the supporting arms 3 are flexible at least in regions in the radial direction, but at least can be deflected elastically in the radial direction with respect to the base element 4.

The latching arm 2 has a latching region 5 and an actuating region 6. In this case, the latching region 5 is arranged on one side of the base element 4 (on the left in FIG. 1) and the actuating region 6 is arranged on the respective other side. By a force being applied on the actuating region 6 in the radial direction—because of the flexible fastening to the base element 4—the latching region 5 can be deflected in the opposite direction. It can be seen in FIG. 1 that the latching arm 2 has, in the latching region 5 thereof, a latching means 7 which is designed as a latching lug 8. The latching lug 8 has a stop surface 9 on one side thereof and a sliding surface 10 on the other side thereof. In this case, the stop surface 9 is provided, for example, substantially perpendicularly to a longitudinal axis 11 of the latching element 1 and points radially inward from the latching arm 2. However, as an alternative, the stop surface 9 may be inclined with the radially inwardly pointing end thereof in the direction of the actuating region 6. The sliding surface 10 is arranged obliquely in relation to the longitudinal axis 11. Opposite the latching means 7, a securing element 12 is formed on the latching arm 2. The securing element 12 is a substantially rectangular projection which points radially outward.

The region in which the latching arm 2 is fastened to the base element 4 is referred to below as the bearing point 13, even if this is only to be understood in the transmitted sense. The latching arm 2 may be angled with respect to the base element 4, for example when the radially inwardly pointing force is applied in the actuating region 6. This means that the latching arm 2 itself has to be configured in such a manner that it is stiff enough in order to convert shifting of the actuating region 6 radially inward into a radially outwardly pointing shifting of the latching region 5. In this case, the base element 4 is elastically deformed in the region of the bearing point 13.

In order to be able to transmit the torque impressed on the latching arm 2 by the force, said latching arm is of comparatively solid design in the region of the bearing point 13, i.e. has a larger cross section than in remaining regions. As an alternative, stiffening means can be provided.

In the actuating region 6, the latching arm 2 has an engagement mating element 14 and a supporting region 15. Both the engagement mating element 14 and the supporting region 15 are increased in an outwardly directed manner in the radial direction in relation to the region located in between such that an engagement element 16 (described later) can engage in said region.

A stop element 17 and a latching means 18 are arranged on the supporting arm 3. The stop element 17 is substantially rectangular in the cross section thereof and points radially inward from the supporting arm 3. In this case, an edge which points inward and in the direction of the latching means 7 can have a bevel, i.e. can be beveled. By contrast, the latching means 18 is designed similarly to the latching means 7, i.e. points radially inward and has, in addition to a stop surface 19, a sliding surface 20 which faces away therefrom, and a radially outwardly pointing securing element 21 (not visible here). In contrast to the stop surface 9 of the latching arm 2, the stop surface 19 of the supporting arm 3 is inclined and, with the radially inwardly directed end thereof, does not point in the direction of the actuating region 6 but rather in the opposite direction. In this case, the stop surface 19 does not have to be a plane but rather may have a curvature or a radius, for example, in the cross section thereof.

As can clearly be seen in FIG. 1, the latching element 1 is substantially designed in the form of a bushing, wherein the latching arms 2 and the supporting arms 3 are distributed radially over the circumference of the latching element 1 and each lie diametrically opposite one another.

Figure 2:
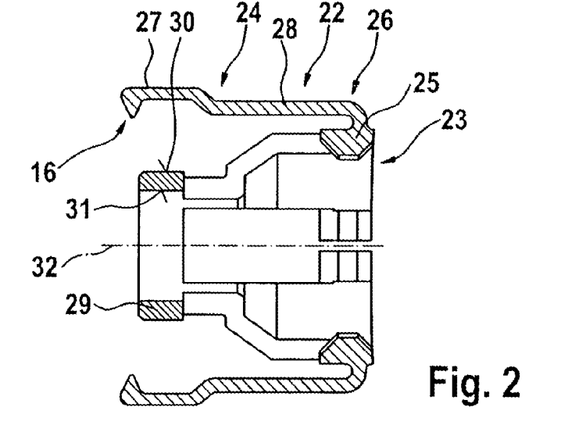
FIG. 2 shows a sectional view of a carrier element for holding the latching element.

FIG. 2 shows a carrier element 22 in a sectional illustration. Operating elements 24 are arranged in an elastically deflectable manner on a base element 23 of the carrier element 22. Overall, two operating elements 24 lying diametrically opposite each other are provided. The operating elements 24 are fastened to a ring 25 of the basic element 23 in such a manner that said operating elements can be deformed elastically in a bearing point 26 and can therefore be shifted radially inward together with the engagement element 16, which is provided on the operating element 24, by a radially inwardly directed force applied to an operating region 27. In this exemplary embodiment, the operating element 24 is designed as a flexible tongue 28 or flexible rocker. Furthermore, the basic element 23 of the carrier element 22 has a sleeve 29 which forms a guide surface 30 on its outer circumferential surface. In addition to the guide surface 30, the sleeve 29, by means of its circumferential surface located radially on the inside, has a bearing surface 31. The sleeve 29 and the ring 25 are preferably held in a fixed position relative to each other by the basic element 23, i.e. said region of the carrier element 22 is preferably of stiff design. The carrier element 22 is formed substantially symmetrically to the longitudinal axis 32 thereof. The sleeve 29 together with the guide surface 30 thereof at the same time forms a pivot point for the latching element 1 or the base element 4 thereof when the inwardly pointing force is applied to the actuating region 6 in order to shift the latching region 5.

Figure 3:
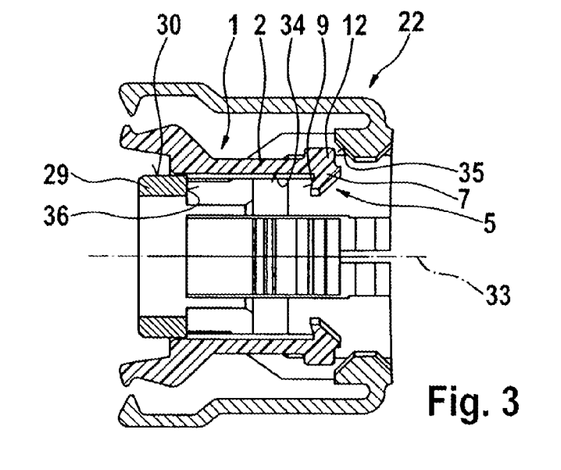
FIG. 3 shows a sectional view of a joint arrangement of the carrier element and latching element.

FIG. 3 shows a joint sectional illustration of the latching element 1 and of the carrier element 22, wherein the latching element 1 is supported in the carrier element 22. It is clear that the latching element 1 and the carrier element 22 have a common longitudinal axis 33 in which the longitudinal axis 11 and the longitudinal axis 32 run coaxially. The latching element 1 is arranged in the carrier element 22 in such a manner that said latching element is supported by means of a running surface 34—which can be formed by the latching arms 2 and/or the supporting arms 3—of the guide surface 30 of the sleeve 29. The latching element 1 is thereby arranged displaceably in the carrier element 22, i.e. can be displaced in the axial direction—that is to say in the direction of the longitudinal axis 33. However, the latching element 1 cannot move out of the carrier element 22. A movement of the latching element 1 to the right out of and beyond the carrier element 22 is prevented by interaction of the securing element 12 and an oblique surface 35 which is provided on the ring 25 of the carrier element 22. The oblique surface 35 here is designed in such a manner that, during further movement of the latching element 1 to the right, radial shifting of the latching region 5 or of the latching means 7 of the latching arm 2 occurs. In the process, the latching arm 2 is elastically deformed. Movement of the latching element 1 out of the carrier element 22 to the left is prevented by interaction of the stop surface 9 with a mating surface 36 which is represented by an end surface of the ring 25.

Figure 4:
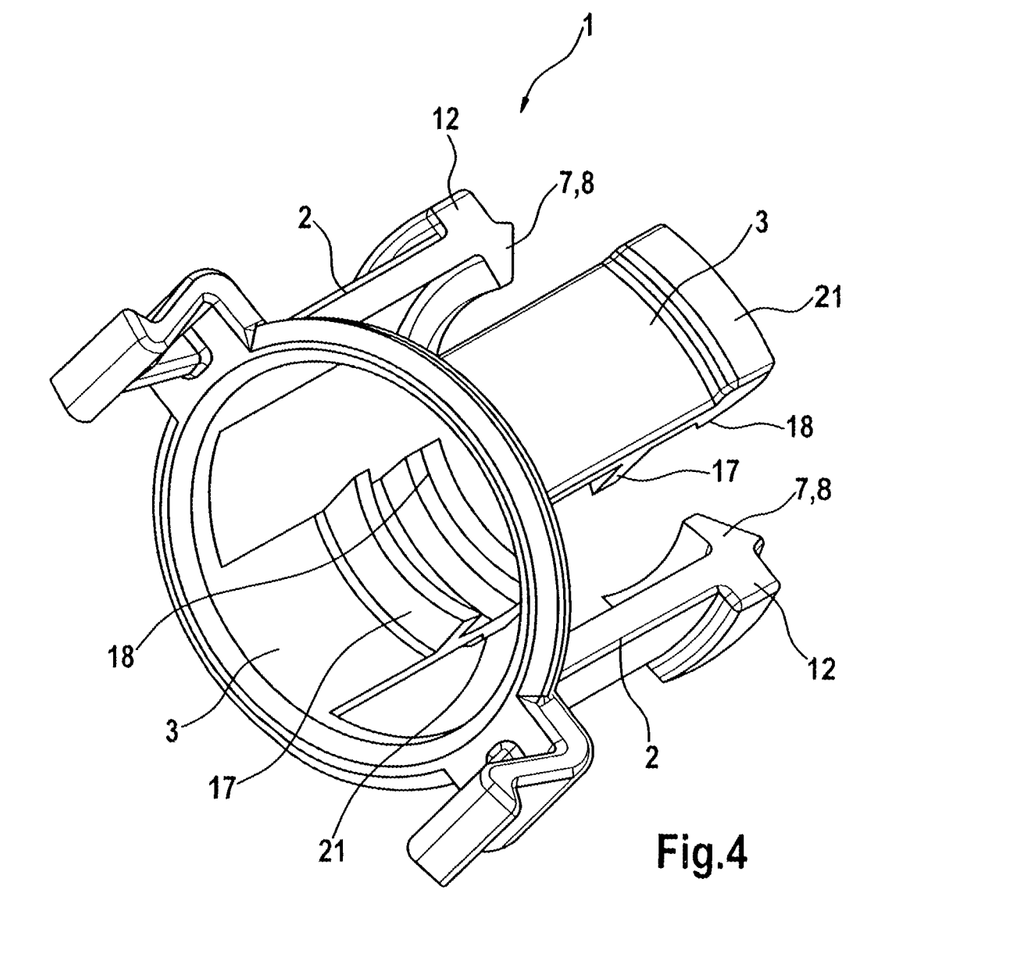
FIG. 4 shows an isometric illustration of the latching element.

FIG. 4 shows an isometric illustration of the latching element 1. It can once again be clearly seen here that in each case two latching arms 2 and two supporting arms 3 which each lie diametrically opposite each other are provided. The latching means 7 is present on the latching arms 2 in the form of the latching lug 8 which points radially inward while the securing element 12 points radially outward. By contrast, the stop element 17, which is present in the form of a rib, and the latching means 18 are provided on the supporting arm 3, the stop element 17 and latching means 18 pointing radially inward while the securing element 21 runs radially outward. In this case, the securing elements 12 and the securing elements 21 form an interrupted circular ring, i.e. are at the same distance from the longitudinal axes 11, 32 or 33 (not illustrated here). As is apparent from FIG. 3—the securing elements 12 and the securing elements 21 can thereby interact with the oblique surface 35 of the carrier element 22 in order to bring about a restriction of the axial movement of the latching element 1 and an elastic deformation of the latching arms 2 radially inward.

Figure 5:
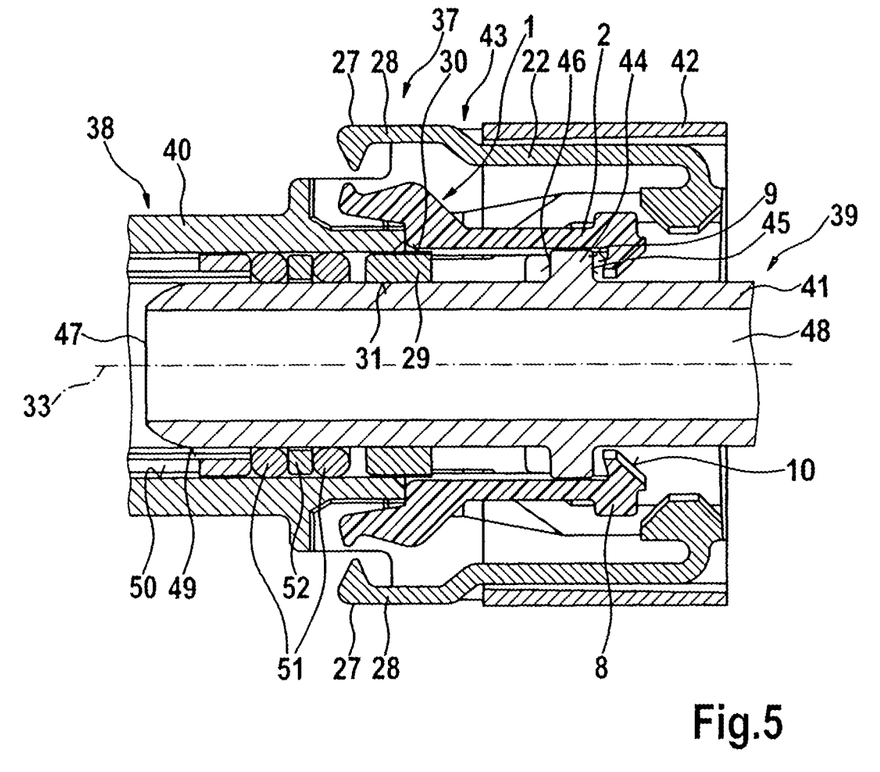
FIG. 5 shows a plug-in coupling for connecting two lines, wherein a first coupling member and a second coupling member are provided, and the carrier element holding the latching element is fastened to the first coupling member.

FIG. 5 shows a plug-in coupling 37 for releasably connecting two lines 38 and 39. The first line 38 is assigned here to a first coupling member 40 and the second line is assigned to a second coupling member 41. The carrier element 22 is fastened to the first coupling member 40, wherein said carrier element is arranged in a housing 42 which has recesses 43 in order to permit actuation of the operating region 27 of the tongues 28. For this reason, the recesses 43 are formed only in the region of the operating regions 27, even in the circumferential direction. As already described with reference to FIG. 3, the latching element 1 is arranged displaceably in the carrier element 22, the latching element being mounted in a sliding manner on the guide surface 30 of the sleeve 29. The sleeve 29 serves at the same time as a bearing surface 31 for the second coupling member 41. The sleeve 29 completely surrounds the second coupling member 41 in the circumferential direction. This is the case in particular in the region of an engagement element 29' of the sleeve 29. Said engagement element 29' engages in a radial intermediate space between the coupling members 40 and 41. By this means, the coupling members 40 and 41 are guided radially, and radial displacement and/or tilting of the coupling members 40 and 41 are/is suppressed, which increases both the stability and the tightness of the plug-in coupling 37.

The second coupling member 41 has a holding rib 44 which has an (advantageously planar) stop surface 45 which can interact with the (for example likewise planar) stop surface 9 of the latching arm 2. For this purpose, the latching means 7 or the latching lug 8 engages over the holding rib 44 in the radial direction in such a manner that the stop surface 9 rests on the stop surface 45. In particular, a rounded portion or bevel, possibly provided on the holding rib 44, is bridged as a result in such a manner that the latching means 7 cannot unintentionally slide off the holding rib 44. On the contrary, the intention is for a form-fitting connection of latching means 7 and holding rib 44 and of the stop surfaces 9 and 45 always to be present. An actuator surface 46 is provided on that side of the holding rib 44 which faces away from the stop surface 45. Said actuator surface cooperates—which cannot be seen here—with the stop element 17 of the supporting arm 3 in order, upon displacement of the second coupling member 41 in the direction of the first coupling member 40, to bring about shifting of the latching element 1 in this very direction. In the exemplary embodiment illustrated here, the first coupling member 40 is designed as an SAE housing. The first and/or the second coupling member 40 and/or 41 therefore advantageously comply/complies with the SAE standard.

In order to achieve a reliable fluid connection between a region 47 of the second line 39, which region conducts a first fluid, and a region of said line, which region conducts a second fluid, one or more seals, for example in the form of O rings 51, are arranged between an outer circumferential surface 49 of the second coupling member 41 and an inner circumferential surface 50 of the first coupling member 40. A spacer 52 is arranged between the two O rings 51 provided in this exemplary embodiment, said spacer keeping the two O rings 51 at a defined minimum distance in the axial direction. The O rings 51 are held at the axial position thereof by the engagement element 29'.

The plug-in coupling 37 is provided to releasably connect the first line 38 to the second line 39. For this purpose, as shown in FIG. 5, the second coupling member 41 is pushed into the first coupling member 40 until the latching lug 8 or the latching means 7 engages behind the holding rib 44 and therefore realizes a latching holding of the holding rib 44—which may also be referred to as the latching mating element. Upon said latching holding, the stop surfaces 9 and 45 or 19 and 45 interact.

In order to facilitate the insertion of the second coupling member 41 and in particular of the holding rib 44 into the first coupling member 40, the latching means 7 has the sliding surface 10. If, during the insertion of the second coupling member 41, the holding rib 44 acts counter to the sliding surface 10, the latter brings about a radial rebound of the latching arm 2 and of the supporting arm 3 such that the holding rib 44 can run through the region of the latching means 7 and 18, respectively, after which the latching arm 2 and supporting arm 3 spring back elastically into the starting position thereof and therefore the latching means 7 and the latching means 18 engage behind the holding rib 44 and thus produce a form-fitting connection by engaging therebehind. This means that the second coupling member 41 can no longer readily be pulled out of the first coupling member 40.

Figure 6:
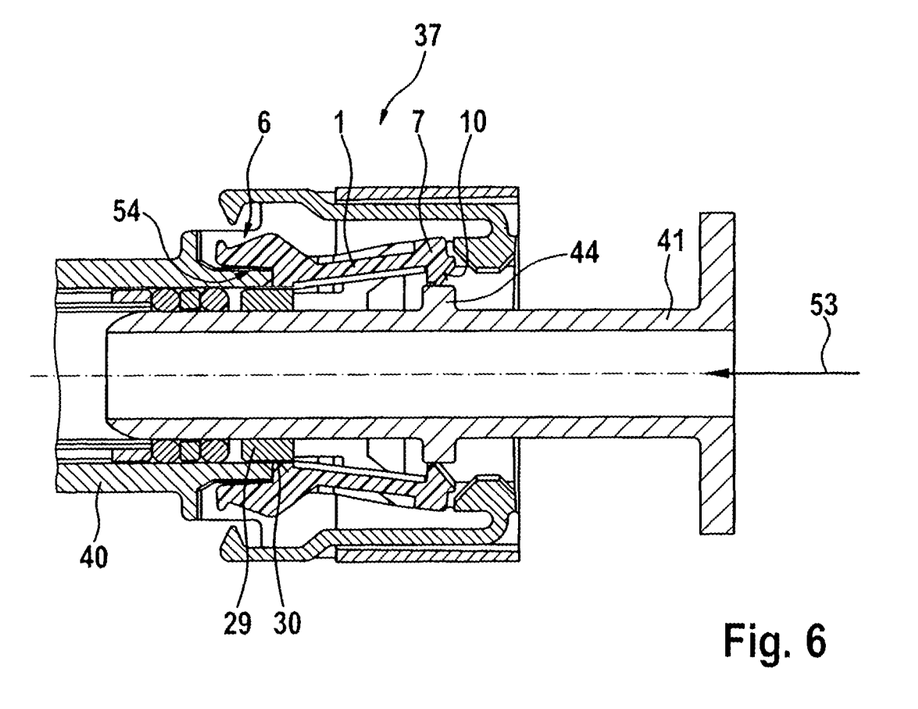
FIG. 6 shows the plug-in coupling, wherein a connecting operation of the coupling members is illustrated.

FIG. 6 clarifies this connecting operation of the coupling members 40 and 41 of the plug-in coupling 37. It is clear that the second coupling member 41 is provided as a joining flange, for example on a housing, while the first coupling member 40 belongs, for example, to a hose line. In order to produce the releasable connection, the coupling members 40 and 41 are pushed one onto the other or one inside the other. In the example depicted, the second coupling member 41 is pushed into the first coupling member 40, which is indicated by the arrow 53.

A state is illustrated, in which the holding rib 44 causes a radial shifting of the latching means 7 and of the latching means 18 by interaction with the sliding surface 10 and the sliding surface 20, respectively (the latter cannot be seen here). The holding rib 44 can therefore be displaced in the axial direction under the latching means 7 and the latching means 18. By means of the interaction of the holding rib 44 and the sliding surfaces 10 and 20, the latching element 1 is shifted at the same time or beforehand into the illustrated position. In said position, the latching element 1 is supported in the radial direction by the guide surface 30 of the sleeve 29 while a recess 54 of the latching arm 2, which recess is provided in the radial direction below the actuating region 6, interacts with a region of the first coupling member in order to prevent a further axial shifting of the latching element 1 in the direction of the first coupling member 40. In said axial position, the latching element 1 is in a latching arm release position. This means that the latching arm 2 or the latching means 7 thereof can readily be shifted outward in the radial direction, as graphically illustrated in FIG. 6. This applies analogously to the supporting arm 3.

If the second coupling member 41 is shifted further in the direction of the first coupling member 40, then, as already described, the latching means 7 and 18 engage behind the holding rib 44. A connection is thus produced between the coupling members 40 and 41 and the lines 38 and 39. If the connection produced by means of the plug-in coupling 37 is then subjected to a tensile load in the axial direction, for example by means of a fluid pressure present in the regions 47 and 48 conducting fluid, the stop surface 9 of the latching means 7 interacts with the stop surface 45 of the second coupling member 41 in order to shift the latching element 1 into the axial position illustrated in FIG. 7. This is referred to as the latching arm securing position. In this state, the securing element 12 enters into connection with the oblique surface 35 and, on the one hand, prevents a further axial shifting of the latching element 1 and therefore also of the second coupling member 41 and, on the other hand, causes a shifting of the latching means 7 inward in the radial direction such that said latching means is forced in the direction of the holding rib 44.

Figure 7:
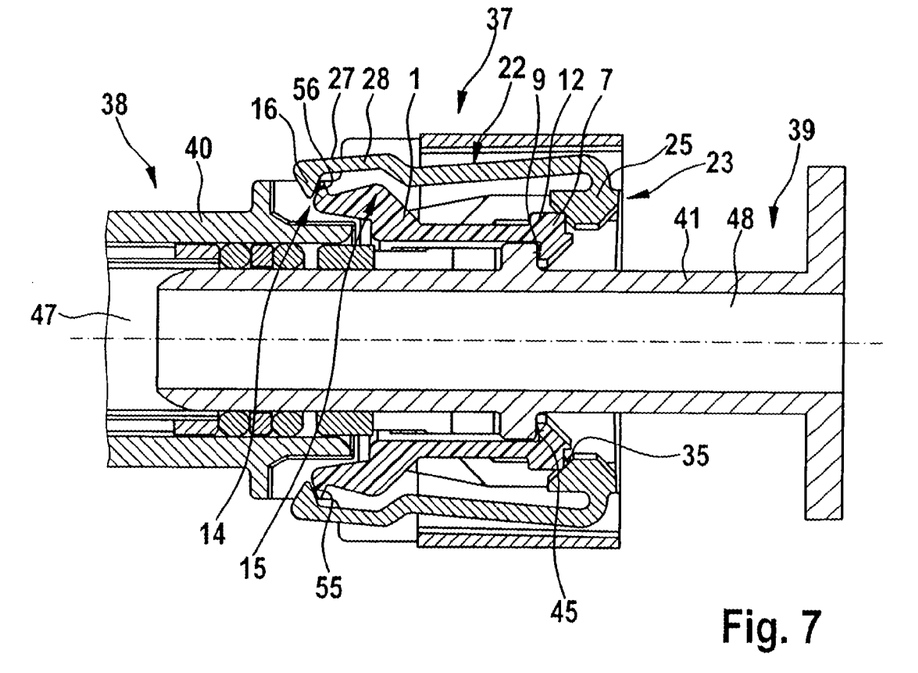
FIG. 7 shows the plug-in coupling, wherein the latching element is in a latching arm securing position.

The latching holding of the holding rib 44 by the latching means 7 and 18 therefore constitutes a self-locking connection. The greater the force with which the second coupling member 41 is to be moved in the direction facing away from the first coupling member 40, the more pronounced is the latching holding of the holding rib 44 by the latching means 7 and 18. The ring 25 of the basic element 23 of the carrier element 22 therefore prevents the second coupling member 41 from being able to be pulled out of the first coupling member 40 and therefore the lines 38 and 39 being separated from each other.

At this juncture, it is of importance to emphasize that, in the latching arm securing position present according to FIG. 7, actuation of the operating region 27 of the carrier element 22 does not have any consequences, i.e. cannot bring about release of the connection of the lines 38 and 39. It is clear in this regard that the latching arm securing position corresponds to a non-engagement position in which the engagement element 16 of the tongue 28 cannot engage in that region of the latching arm 2 which lies between the engagement mating element 14 and supporting region 15. On the contrary, both the engagement element 16 and the engagement mating element 14 are configured in such a manner that, upon actuation of the operating region 27, the latching element 1 is forced further into the latching arm securing position thereof. This is achieved by the two interacting oblique surfaces 55 and 56. Upon an even greater actuation of the operating region 27, a region of the tongue 28 or of the operating region 27 enters into touching contact with the supporting region 15. In this state, the latching element 1 is fixed in the axial direction with the engagement mating element 14 thereof and the supporting region 15 between the engagement element 16 and a further region of the tongue 28 such that the latching element 1 can move neither in the direction of the latching arm securing position nor in the direction of the latching arm release position.

Figure 8:
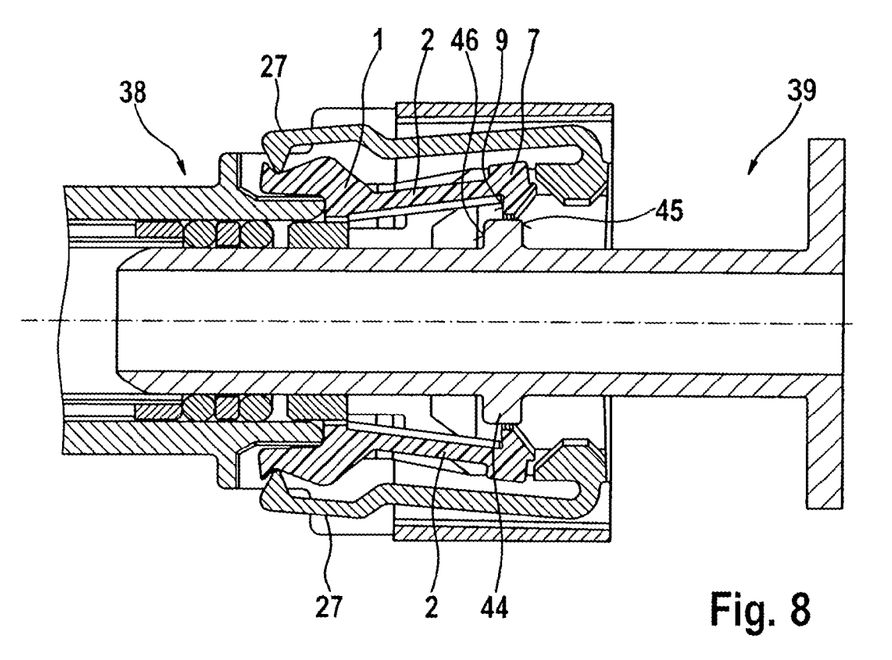
FIG. 8 shows the plug-in coupling, wherein the latching element is in a latching arm release position, and an operating element of the carrier element is actuated in order to shift the latching arm into a separating position.

FIG. 8 clarifies the manner in which the connection of the lines 38 and 39 can be released. First of all, the latching element 1 has to be shifted into the latching arm release position. This takes place by the second coupling member 41 being shifted in the direction of the first coupling member 40. In the process, the holding rib 44 or the actuator surface 46 thereof interacts with the stop element 17 of the supporting arm 3 (not visible here) such that the latching element 1 is likewise moved in said direction. If the latching element 1 is in the latching arm release position thereof, then, by simultaneous actuation of the two opposite operating regions 27, the latching arms 2 can be shifted into a separating position. In said separating position, the latching means 7 is brought into a position in which the stop surface 9 can no longer interact with the stop surface 45 of the holding rib 44, and therefore the latter can readily be moved through under the latching means 7.

In order to release the connection of the lines 38 and 39, it is therefore necessary first of all to displace the latching element 1 into the latching arm release position thereof, and subsequently to actuate both operating regions 27 simultaneously. As shown above, actuation of the operating regions 27—if the latching element 1 is in the latching arm securing position—does not lead to release of the connection.

Figure 9:
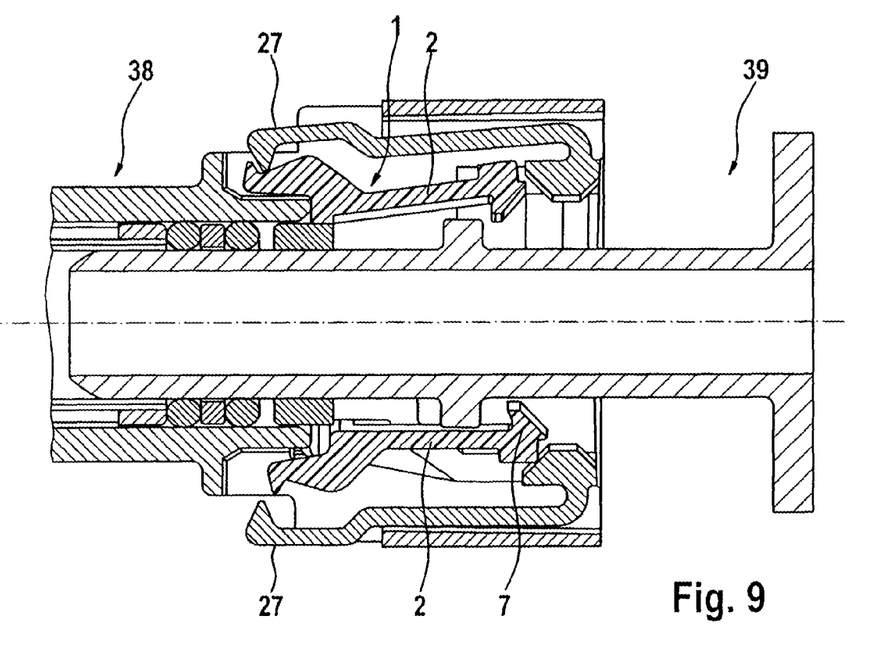
FIG. 9 shows the plug-in coupling, wherein the latching element is in the latching arm release position, but only one of the two latching arms is actuated.

The actuation of just one operating region 27 similarly cannot lead to a release of the connection, this being illustrated with reference to FIG. 9. In this example, only the operating region 27 illustrated at the top is actuated whereas the lower remains unaffected. Although it follows therefrom that the upper latching arm 2 can enter the separating position, since the latching arm 1 was in the latching arm release position thereof before the operating region 27 was actuated, should it nevertheless be attempted to pull the second coupling member 41 out of the first coupling member 40, the lower latching arm 2, which is not in the separating position, is displaced forward in the axial direction such that the latching element 1 as a whole is elastically deformed. While the upper region of the latching element 1 is still in the latching arm release position, the lower region lies in the latching arm securing position, as a result of which the latching means 7 of the lower latching arm 2 is forced radially inward and therefore in the direction of the holding rib 44. A release of the connection is thereby not possible.

Figure 10:
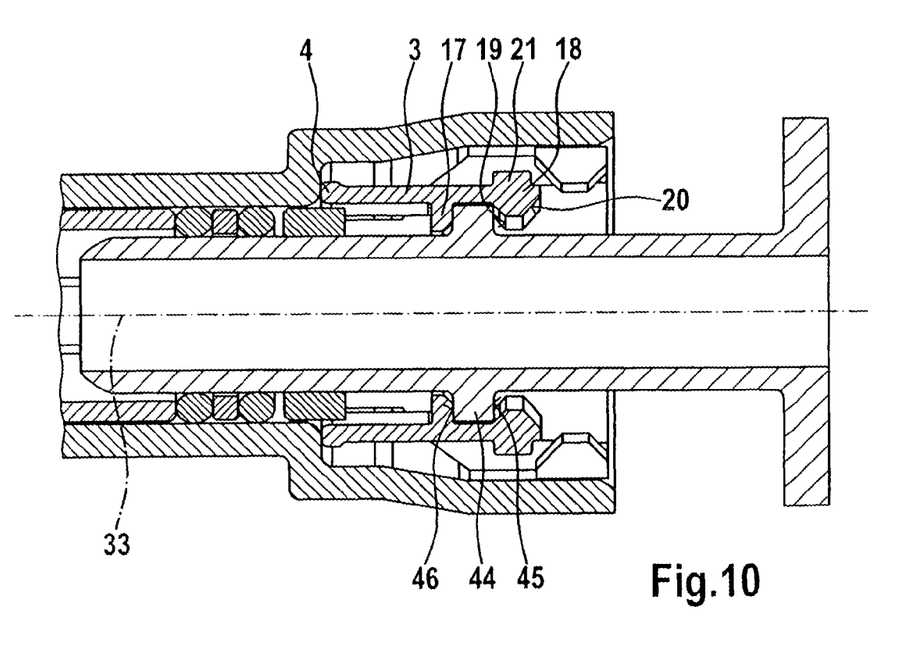
FIG. 10 shows a sectional view of a plug-in coupling rotated through 90°.

FIG. 10 furthermore clarifies the function of the stop element 17 which is provided on the supporting arms 3. It is shown that the actuator surface 46 of the holding rib 44 interacts with the stop element 17 in order axially to displace the latching element 1 in the direction of the first coupling member 40 when the second coupling member 41 is shifted in said direction. It is also shown that the latching means 18 of the supporting arm 3 differs slightly from the latching means 7 of the latching arm 2. Although the stop surface 19, the sliding surface 20 and the securing element 21 are also present here, the stop surface 19 is not provided perpendicularly to the longitudinal axis 33 here. On the contrary, said stop surface is arranged obliquely with respect to said longitudinal axis in such a manner that, during an axial pulling of the second coupling member 41 out of the first coupling member 40, the stop surface 45 of the holding rib 44 interacts with the stop surface 19 in such a manner that the latching means 18 is deflected outward in the radial direction when the latching element 1 is in the latching arm release position thereof.

In this case, the stop surface 19 can be an oblique surface, or, as illustrated in FIG. 10, can have a curvature or rounded portion such that the holding rib 44 can interact with said stop surface for the radial shifting of the latching means 18 outward. The latching means 18 of the supporting arms 3 therefore hold the holding rib 44 only in the latching arm securing position of the latching element 1. This has the advantage that a four-point support of the second coupling member 41 is realized together with the latching means 7 of the latching arm 2, and therefore tilting of the coupling members 40 and 41 in relation to each other is prevented.

The carrier element 22 is designed at the same time to hold the O rings 51, i.e. the sealing elements, in position. For this purpose, the carrier element has the engagement element 29'. Said carrier element also serves as a guide element for the latching element 1 in the axial and radial directions, and also as a stop for the latching element 1. In this case, the latching element 1 is guided on the guide surface 30 of the sleeve 29 of the carrier element 22. In the latching arm release position, the carrier body 22 therefore absorbs the radial forces which are in effect for the radial shifting of the latching arms 2 into the separating position without transmitting said forces to the first coupling member 40, which would lead to increased pull-out forces, i.e. pulling of the second coupling member 41 out of the first coupling member 40 is made more difficult. For this reason the latching element 1 can be produced from a particularly flexurally elastic material, for example plastic. Similarly, the latching element 1 can be constructed comparatively simply structurally, since no stiffening ribs or the like whatsoever have to be provided in order to produce the forces necessary for opening the latching arms 2 and for shifting the latter into the separating position.

The invention claimed is:

1. A plug-in coupling for releasably connecting two lines, the coupling comprising:
   a first coupling member and a carrier element to be fastened to said first coupling member;
   a second coupling member having a latching mating element;
   a latching element disposed on said carrier element and having at least one latching arm;
   said latching arm, in a latching position, holding said second coupling member at said latching mating element;
   said latching element being mounted for displacement in an axial direction relative to said carrier element, while said latching arm is in the latching position, for taking up at least one latching arm securing position and a latching arm release position; and
   an operating element disposed on said carrier element and configured for enabling a disconnection between the two lines;
   said operating element, upon an actuation thereof while said latching element is in the latching arm release position, shifting said latching arm into a separating position, and, upon an actuation thereof while said latching element is in the latching arm securing position, holding said latching element in the latching arm securing position.

2. The plug-in coupling according to claim 1, wherein said operating element is integrally formed on said carrier element.

3. The plug-in coupling according to claim 1, wherein the latching arm release position is an engagement position in which said operating element engages said at least one latching arm, and said latching arm securing position is a position in which said operating element does not directly contact said at least one latching arm.

4. The plug-in coupling according to claim 1, wherein said latching element is formed as a bushing, and said at least one latching arm and said at least one supporting arm are distributed over a circumference of said latching element.

5. The plug-in coupling according to claim 1, wherein said operating element is a flexible tongue.

6. The plug-in coupling according to claim 1, wherein said latching arm and said latching mating element have interacting stop surfaces formed substantially perpendicular to a longitudinal axis of at least one of said first or second coupling member.

7. The plug-in coupling according to claim 1, wherein said carrier element has a guide surface for said latching element, and wherein at least regions of said guide surface lie between said second coupling member and said latching element.

8. The plug-in coupling according to claim 1, which comprises a deformable base element of said latching element for a substantially independent axial shifting of a plurality of latching arms.

9. The plug-in coupling according to claim 1, wherein at least one of the following is true: said operating element is formed integrally with said carrier element, and said latching arm is formed integrally with said latching element.

10. The plug-in coupling according to claim 1, wherein one or both of said latching element and said carrier element are composed of plastic material.

11. The plug-in coupling according to claim 1, wherein at least one of said latching element and said carrier element is an injection molded part.

12. The plug-in coupling according to claim 1, wherein said at least one latching arm is one of a plurality of latching arms each assigned an operating element, and wherein said latching arms may be brought into the separating position only when at least two of said operating elements are actuated.

13. The plug-in coupling according to claim 12, wherein said latching arms are disposed diametrically opposite one another.

14. The plug-in coupling according to claim 1, wherein said carrier element is formed with a bearing point for said latching element.

15. The plug-in coupling according to claim 14, wherein said bearing point for said latching element is formed on a guide surface of said carrier element.

16. The plug-in coupling according to claim 1, wherein said carrier element includes an engagement element arranged radially between said first coupling member and said second coupling member.

17. The plug-in coupling according to claim 16, wherein said engagement element is configured for axially holding at least one seal.

18. The plug-in coupling according to claim 1, which comprises a housing and wherein at least one of said carrier element or said latching element is at least partly disposed in said housing.

19. The plug-in coupling according to claim 18, wherein said housing is formed of a material selected from the group consisting of plastic and metal.

20. The plug-in coupling according to claim 18, wherein one or both of said carrier element and said housing has a recess formed therein for said operating element.

21. The plug-in coupling according to claim 1, wherein said latching element is formed with at least one stop element disposed to interact with said latching mating element in order to shift said latching element into the latching arm release position.

22. The plug-in coupling according to claim 21, wherein said at least one stop element is formed on at least one of a supporting arm or said latching arm.

23. The plug-in coupling according to claim 22, wherein said latching arm has latching means in order, at least in the latching arm securing position, to engage with said latching mating element in order to hold said second coupling member by engaging therebehind.

24. The plug-in coupling according to claim 23, wherein said carrier element has at least one holding means for holding at least one of said latching arm or said latching means of said supporting arm in the latching position when the latching element is in the latching arm securing position.

* * * * *